United States Patent [19]

Kakuta et al.

[11] Patent Number: 4,811,492

[45] Date of Patent: Mar. 14, 1989

[54] CANT ANGLE SENSOR ASSEMBLY

[75] Inventors: Yonehiro Kakuta; Kouichi Takigawa; Akio Noji; Shigeaki Kuwabara; Tadashi Shimada; Michihiro Iida, all of Wako, Japan

[73] Assignee: Honda Giken Kogyo Kabushiki Kaisha, Tokyo, Japan

[21] Appl. No.: 90,281

[22] Filed: Aug. 28, 1987

[30] Foreign Application Priority Data

Aug. 29, 1986 [JP] Japan .............................. 61-132370[U]
Aug. 29, 1986 [JP] Japan .............................. 61-203257
Nov. 12, 1986 [JP] Japan .............................. 61-173559[U]

[51] Int. Cl.$^4$ ................................................ G01B 7/00
[52] U.S. Cl. .......................................... 33/366; 33/391
[58] Field of Search ........................... 33/366, 391, 402

[56] References Cited

U.S. PATENT DOCUMENTS 3,206,151 9/1965 Lillestrand ...................... 33/366 X
4,700,479 10/1987 Saito .................................. 33/366

FOREIGN PATENT DOCUMENTS

1027519 7/1983 U.S.S.R. ............................... 33/391

*Primary Examiner*—Harry N. Haroian
*Attorney, Agent, or Firm*—Armstrong, Nikaido, Marmelstein & Kubovcik

[57] ABSTRACT

A cant angle sensor assembly, includes a pendulum pivoted on a supporting system adapted to be mounted on an object whose cant angle is to be sensed, for swinging movement in a direction of tilt of the object, a movable electrode provided on the pendulum and having a first and a second movable electrode plate, and a first stationary electrode plate fixedly mounted on the supporting system in an opposed relation to one of the first and second movable electrode plates of the movable electrode at a predetermined gap, with an area of the first stationary electrode plate opposed to one of the first and second movable electrode plates being invariable despite vibration of the pendulum. Further, second and third stationary electrode plates are fixedly mounted on the supporting system in an opposed relation to the other of the first and second movable electrode plates of the movable electrode plate at a given gap, so that with the swinging movement of the pendulum, areas of the second and third stationary electrode plates opposed to the other of the first and second movable electrode plates are increased and decreased in a manner contrary to each other.

7 Claims, 11 Drawing Sheets

CANT ANGLE SENSOR ASSEMBLY

BACKGROUND OF THE INVENTION

1. Field of the Invention

The present invention relates to a cant angle sensor assembly for use in sensing the tilt of an object such as a body of an agricultural tractor to generate an alarm signal or a signal for controlling a position of the agricultural tractor relative to a working machine, and particularly, to such a cant angle sensor assembly comprising a pendulum serving as a sensing member and pivoted on a supporting system adapted to be mounted on an object whose cant angle is to be detected, for swinging movement in a direction of tilt of an object; a movable electrode plate formed on the pendulum; two stationary electrode plates fixedly mounted on the supporting system in an opposed relation at a given gap to the movable electrode plate, so that with the swinging movement of the pendulum, the areas of the two stationary electrode plates opposed to the movable electrode plate are increased and decreased in a manner contrary to each other; and an electric circuit arranged to detect an electrostatic capacitance between the movable electrode plate and each of the two stationary electrode plates to provide a voltage corresponding to the tilt or cant of the object.

2. Description of the Prior Art

In such prior art cant angle sensor assembly, as disclosed, for example, in Japanese Patent Publication No. 53485/84, the movable electrode plate has been formed on one flat surface of the pendulum and therefore, it has been difficult to form the movable electrode plate to have a wider region on a flat surface of a pendulum of a limited size, resulting in a failure to provide a wider sensing range of cant angles of the object.

In addition, in the above prior art assembly, if the pendulum vibrates due to an external disturbance such as vibration, an input received by the electric circuit becomes unstable, failing to exactly sense the tilt of the supporting system. Therefore, in order to damp the vibration of the pendulum, an oil damper has been provided which utilizes a viscosity resistance of oil to impart a damping force to the pendulum. However, in the prior art assembly including such an oil damper, not only is there a problem in performance in that due to the viscosity of a braking oil varying depending upon the level of temperature, the damping characteristics of the oil damper largely varies at lower and higher temperatures, resulting in an unstable accuracy in sensing the cant angle, but also there is an economical problem that the construction is complicated and costly from the necessity for oil seal means for preventing leakage of the braking oil.

Further, in the cant angle sensor assembly, to exactly sense the tilt of the supporting system, a slight variation in electrostatic capacitance between the common electrode and each of the two stationary electrodes attendant on the displacement of the sensing member must be detected with accuracy, but the electrostatic capacitance is liable to be influenced by a floating capacitance and extraneous noise. Thereupon, to prevent a reduction in sensing accuracy due to such influence, the above prior art assembly is constructed such that the electrostatic capacitance detecting portion is enclosed by a magnetic shield, and this causes an unavoidable complication of structure.

SUMMARY OF THE INVENTION

The present invention has been accomplished with the above circumstances in view, and it is an object of the present invention to provide a cant angle sensor assembly of the type described above, wherein the tilt or cant of an object can be sensed in a wider range of angle by use of a pendulum of a limited size.

It is another object of the present invention to provide a cant angle sensor assembly with simple construction, wherein an eddy current developed when the movable electrode plate of the pendulum moves across a magnetic flux of the permanent magnet is utilized to impart a damping force to the pendulum in order to prevent a vibration of the pendulum and to stabilize the accuracy in detection of the cant angle.

It is another object of the present invention to provide a cant angle sensor assembly of the type described above, which is simple and useful, wherein the supporting system has a magnetic shield function, thereby making it possible to accurately detect a slight variation in eletrostatic capacitance attendant on the displacement of the pendulum with no influence of a floating capacitance and an extraneous noise, so that the tilt or cant of the supporting system can be sensed exactly, even if an exclusive magnetic shield is not provided.

To achieve the above objects, according to a first aspect of the present invention, there is provided a cant angle sensor assembly comprising a pendulum pivoted on a supporting system adapted to be mounted on an object whose cant angle is to be sensed, for swinging movement in a direction of tilt of the object; a movable electrode plate provided on the pendulum; a first stationary electrode plate fixedly mounted on the supporting system in an opposed relation to the movable electrode plate at a given gap, with an area of the first plate opposed to the movable electrode plate being invariable despite vibration of the pendulum; second and third stationary electrode plates fixedly mounted on the supporting system in an opposed relation to the movable electrode plate at a given gap, so that with swinging movement of the pendulum, areas of the second and third stationary electrode plates opposed to the movable electrode plate are increased and decreased in a manner contrary to each other; and an electric circuit arranged to detect an electrostatic capacitance between the movable electrode plate and each of the second and third stationary electrode plates to provide a voltage corresponding to an amount of tilt of the object, wherein the pendulum comprises a depending plate pivoted on the supporting system and an arcuate plate overhanging sideways from a lower end of the depending plate, and the movable electrode plate comprises a first movable electrode plate formed on one of the depending plate and the arcuate plate in an opposed relation to the first stationary electrode plate and a second movable electrode plate formed on the other of the depending plate and the arcuate plate in an opposed relation to the second and third stationary electrode plates.

In addition, according to a second aspect of the present invention, there is provided a cant angle sensor assembly comprising a pendulum pivoted on a supporting system adapted to be mounted on an object whose cant angle is to be detected, for swinging movement in a direction of tilt of the object; a movable electrode plate formed on the pendulum; two stationary electrode plates fixedly mounted on the supporting system in an opposed relation to the movable electrode plate at a given gap, so that with the swinging movement of the pendulum, areas of the two stationary electrode plates opposed to the movable electrode plate are increased and decreased in a manner contrary to each other; and an electric circuit arranged to detect an electrostatic capacitance between the movable electrode plate and each of the two stationary electrode plates to provide a voltage corresponding to an amount of tilt of the object, wherein the movable electrode plate is formed from a non-magnetic material having an electrical conductivity, and a permanent magnet is mounted on the supporting system in an opposed relation to the movable electrode plate.

Further, according to a third aspect of the present invention, there is provided a cant angle sensor assembly comprising a supporting system made of a magnetic material; a sensing member mounted on the supporting system and displaceable in accordance with a tilt of the supporting system; a common movable electrode mounted on the sensing member; a first stationary electrode fixedly mounted on the supporting system in a grounded manner and in an opposed relation to the common movable electrode at a given gap, with an area of the first electrode opposed to the common movable electrode being invariable despite the displacement of the sensing member; second and third stationary electrodes fixedly mounted on the supporting system in an insulated manner and respectively in an opposed relation to the common movable electrode at a given gap, so that with the displacement of the sensing member, areas of the second and third stationary electrodes opposed to the common movable electrode are increased and decreased in a manner contrary to each other; first and second rectangular-wave oscillators mounted respectively in a corresponding relation to the second and third stationary electrodes; a first integration circuit for integrating an output from the first rectangular-wave oscillator by utilizing a resultant electrostatic capacitance between the common movable electrode and each of the first and second stationary electrodes; a second integration circuit for integrating an output from the second rectangular-wave oscillator by utilizing a resultant electrostatic capacitance between the common movable electrode and each of the first and third stationary electrodes; and a differential amplifier circuit for differentially amplifying outputs from the first and second integration circuits, so that an output voltage corresponding to an amount of tilt of the supporting system is derived from the differential amplifier circuit.

Since the pendulum as a sensing member comprises the depending plate pivoted on the supporting system and the arcuate plate overhanging sideways from the lower end of the depending plate, and since the first movable electrode plate opposed to the first stationary electrode plate is mounted on one of the depending and the arcuate plates, while the second movable electrode opposed to the second and third stationary electrodes is mounted on the other, as described above, the first and second movable electrode plates are arranged two-dimensionally and hence, they can be formed respectively to have a wider region without interference from each other.

In addition, since the movable electrode plate on the pendulum is formed from a non-magnetic material having an electrical conductivity and the permanent magnet opposed to the movable electrode plate is mounted on the supporting system, the movable electrode plate also serves as a magnetic braking plate, so that the rapid movement of the movable electrode plate across a magnetic flux of the permanent magnet causes an eddy current to be developped in the movable electrode plate, whereby a large damping force acts on the pendulum, thus making it possible to prevent the vibration of the pendulum.

Further, since the first stationary electrode is fixedly mounted in a grounded condition on the supporting system for supporting the sensing member, and the second and third stationary electrodes are fixedly mounted in an insulated condition on the supporting system, the system substantially surrounds all the electrodes to exhibit a magnetic shield function, and this makes it possible to prevent influences of a floating capacitance and an extraneous noise on electrostatic capaciatnces between every two of the electrodes.

Moreover, in spite of the first stationary electrode being grounded on the supporting system, a variation in electrostatic capacitance dependant on the displacement of the sensing member can be accurately catched in the form of a variation in voltage by cooperation of the rectangular-wave oscillators with the integration circuits.

Additionally, since the common electrode on the sensing member is grounded on the supporting system through a normally constant electrostatic capacitance, it is unnecessary to connect an earth conductor to the sensing member.

The above and other objects, features and advantages of the present invention will become apparent from reading of the following description of the preferred embodiments, taken in conjunction with the accompanying drawings.

BRIEF DESCRIPTION OF THE DRAWINGS

FIGS. 1 to 5 illustrate a first embodiment of the present inventin, wherein

FIGS. 6 to 12 illustrate a second embodiment of the present invention, wherein

DESCRIPTION OF THE PREFERRED EMBODIMENTS

The present invention will now be described in detail by way of embodiments with reference to the accompanying drawings.

Referring first to FIGS. 1 to 4 illustrating a first embodiment of the present invention, a cant angle sensor assembly S includes a base 1 adapted to be mounted on an object O the cant angle of which is to be sensed. Secured to the base 1 are a pair of opposed bracket plates 2, a magnetic shield plate 3 surrounding the bracket plates 2 and an outer casing 4 surrounding the shield plate 3.

The bracket plates 2 are interconnected at their upper ends through a pair of spacer shafts 5. A horizontal pivot 8 for a pendulum 7 is journaled at its opposed ends on a pair of bearings 6 which are threadedly connected to the corresponding bracket plates 2 in the vicinity of the spacer shafts 5. The pendulum 7 is formed from a non-magnetic material having an electrical conductivity, such as Al, and comprises a depending plate 7a downwardly fanned out from the pivot 8 as a center and an arcuate plate 7b extending perpendicularly to and in the opposite directions from a lower end of the depending plate 7a. The depending plate 7a also serves as a first movable electrode plate, while the arcuate plate 7b also serves as a second movable electrode plate.

A pair of electrode units 9 are attached to the corresponding bracket plates 2 and opposed to each other with the depending plate 7a of the pendulum 7, i.e., the first movable electrode plate being widthwise sandwiched therebetween.

Each of the electrode units 9 comprises a cylindrical holder 11 secured to the corresponding bracket plate 2 by a machine screw 10, a cap 12 made of a synthetic resin and fitted over a leading end of the holder 11, a permanent magnet 13 held on a leading end face of the holder 11 by the cap 12, and a first stationary electrode plate 14 fitted over the cap 12 and opposed to the first movable electrode 7a of the pendulum 7 at a given gap. The sizes of the first stationary electrode plate 14 and the first movable electrode plate 7a are selected such that their opposed area may be always invariable in a predetermined sensable range of cant angle. The respective magnets 13 of the electrode units 9 are disposed with their different magnetic poles opposed to each other, so that a magnetic flux developed between both the magnets 13 penetrates the depending plate 7a.

In addition, an electrode holder 15 is also secured to the bracket plates 2 by a pair of mounting shafts 16 to bridge a gap between the lower portions of the bracket plates 2. The electrode holder 15 is formed on its upper surface with a partitioning ridge 17 extending centrally of the upper surface and in parallel to the pivot 8, and holding surfaces 18 curved along a lower surface of the second movable electrode plate 7b with the partitioning ridge 17 sandwiched therebetween. A pair of second and third stationary electrode plates 19 and 20 are affixed to the holding surfaces 18 and opposed to the lower surface of the arcuate plate 7b at a given gap. The sizes of the second movable electrode plate 7b and the second and third stationary electrode plates 19 and 20 are selected such that as the pendulum 7 swings, the opposed area of the second movable electrode plate 7b and the second stationary electrode plate 19 and the opposed area of the second movable electrode plate 7b and the third stationary plate 20 are decreased and increased in a manner contrary to each other.

Figure 5:
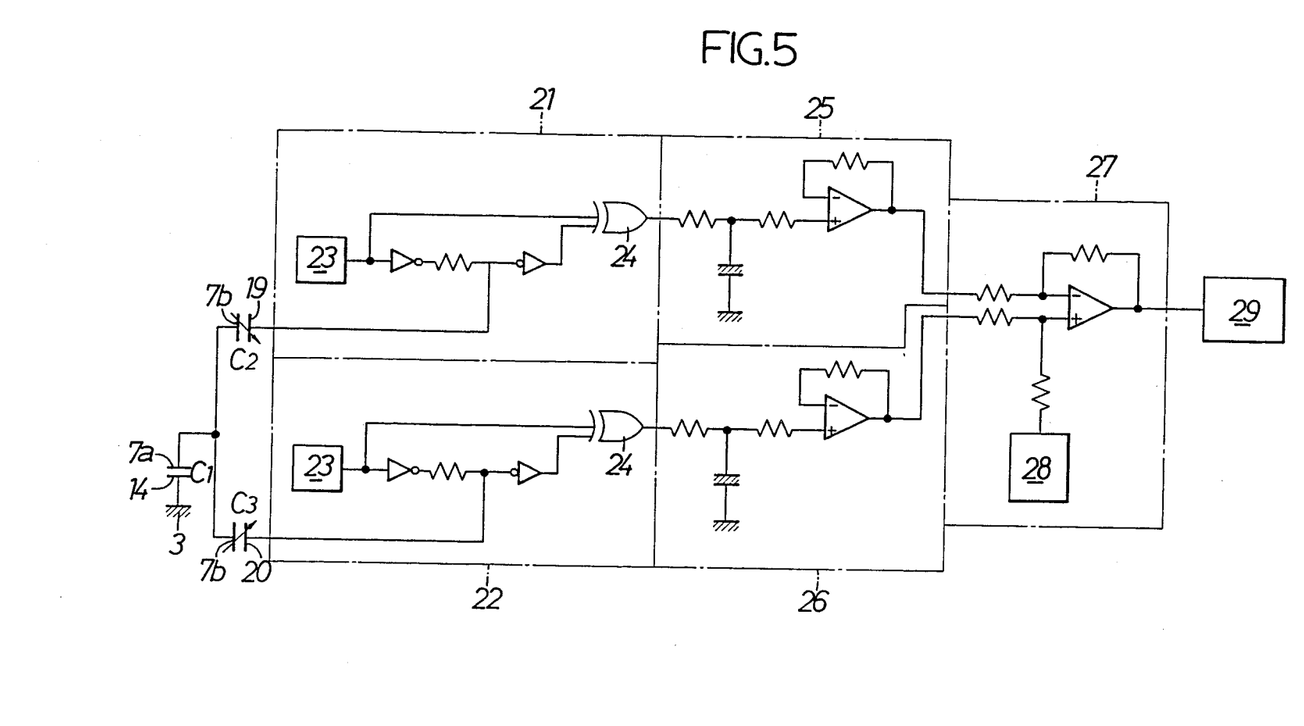
FIG. 5 is a diagram of an electric circuit of the assembly of the present invention.

FIG. 5 illustrates an electric circuit diagram of the cant angle sensor assembly S. In this Figure, an electrostatic capacitance between the first stationary electrode plate 14 and the first movable electrode plate 7a is represented by $C_1$; an electrostatic capacitance between the second stationary electrode plate 19 and the second movable electrode plate 7b is by $C_2$; and an electrostatic capacitance between the third stationary electrode plate 20 and the second movable electrode plate 7b is by $C_3$. The first stationary electrode plate 14 is grounded on the magnetic shield plate 3, and the second and third stationary electrode plates 19 and 20 are connected respectively to first and second capacitance-pulse train converter circuits 21 and 22.

In each of the capacitance-pulse train converter circuits 21 and 22, an output from a rectangular-wave oscillator 23 is integrated to form a pulse train of a duty ratio according to electrostatic capacitances $C_2$ and $C_3$ received from the second and third stationary electrode plates 19 and 20 as an output from an exclusive OR circuit 24.

First and second pulse train-voltage converter circuits 25 and 26 are connected to outputs of the first and second capacitance-pulse train converter circuits 21 and 22, respectively. Each of the pulse train-voltage converter circuits 25 and 26 produces an output voltage corresponding to a duty ratio of an input pulse train.

A differential amplifier circuit 27 is connected to outputs of both the pulse train-voltage converter circuits 25 and 26. In the differential amplifier circuit 27, input voltages from the first and second pulse train-voltage converter circuits 25 and 26 are differentially amplified on the basis of an input voltage from a horizontal reference voltage setter 28.

An indicator 29 is connected to the differential amplifier circuit 27 for indicating a cant angle of the object O in accordance with an output voltage from the differential amplifier circuit 27.

The operation of this embodiment will be described below.

When the object O is in a horizontal position, the electrostatic capacitance $C_2$ between the second stationary electrode plate 19 and the second movable electrode plate 7b is equal to the electrostatic capacitance $C_3$ between the third stationary electrode plate 20 and the second movable electrode plate 7b, i.e., a difference ($C_2-C_3$) between these electrostatic capacitances is zero. Correspondingly, the differential amplifier circuit 27 delivers a specified voltage to the indicator 29.

Figure 1:
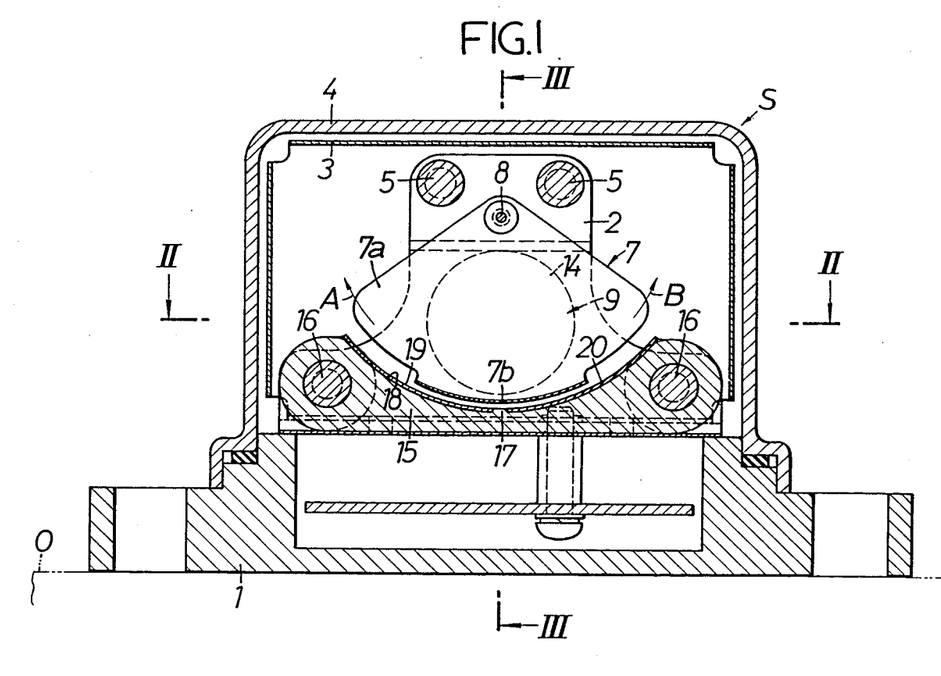
FIG. 1 is a side view in cross section of a cant angle sensor assembly according to the present invention.
Figure 2:
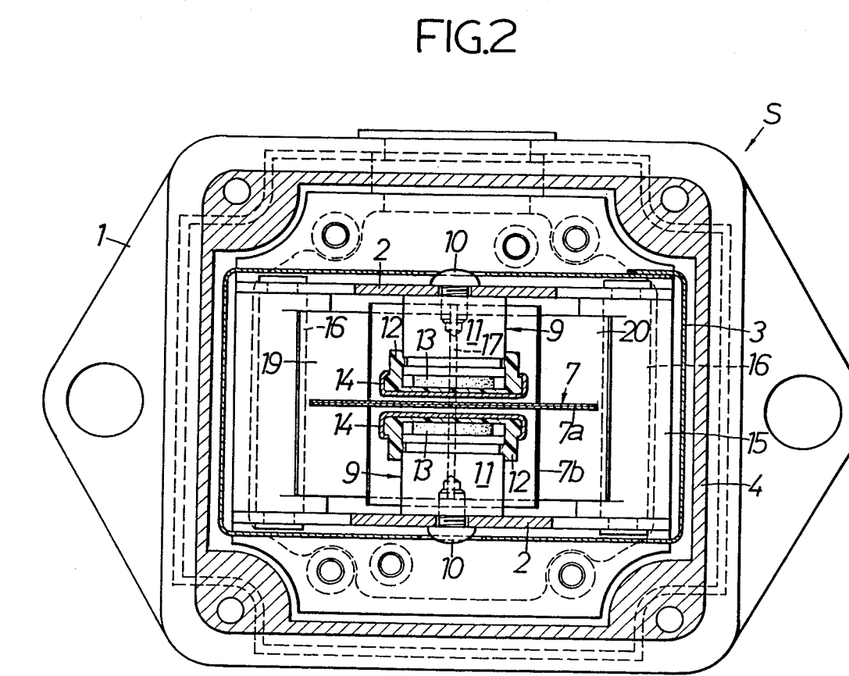
FIGS. 2 and 3 are sectional views taken along lines II—II and III-III in FIg. 1, respectively.
Figure 3:
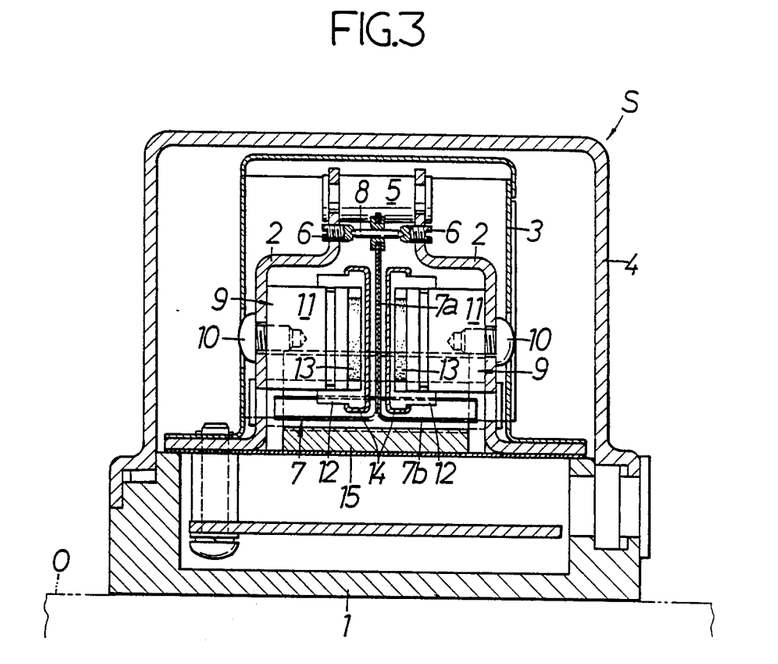
Figure 4:
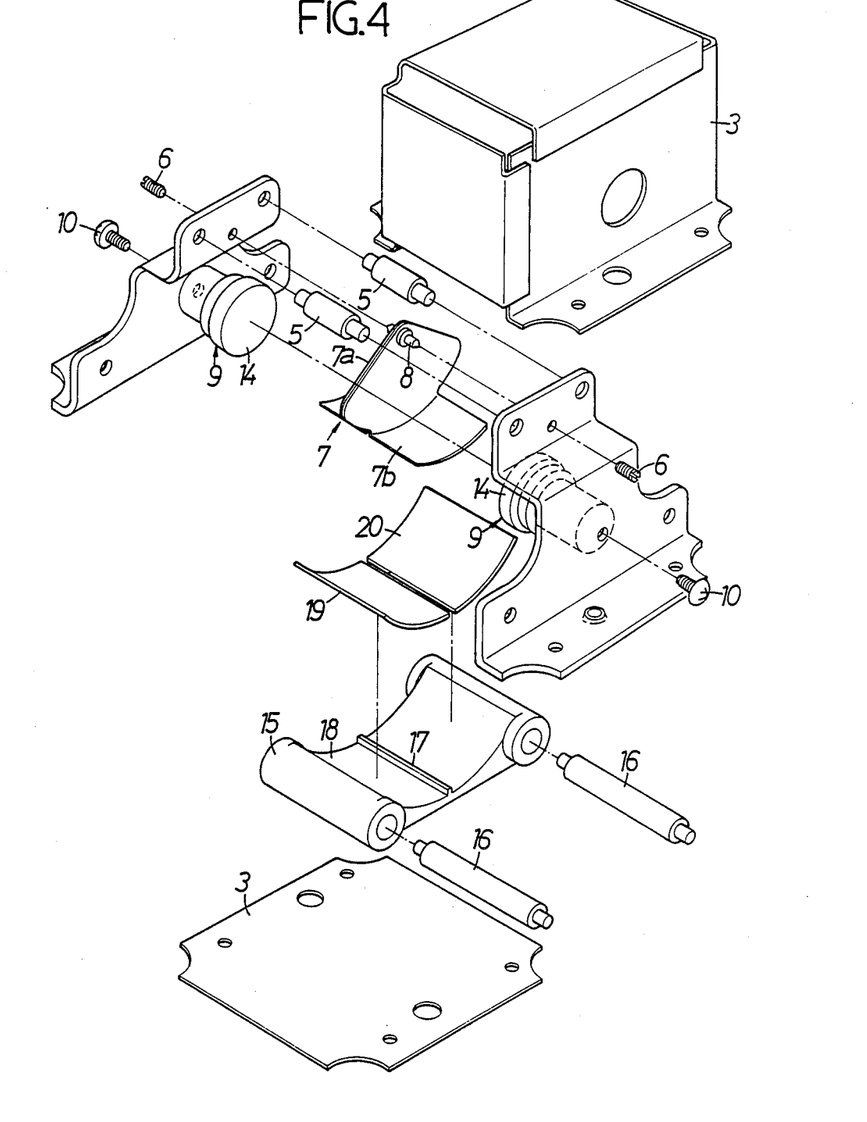
FIG. 4 is a perspective exploded view of details of the assembly of the present invention.

Now assuming that the pendulum 7 has been swung in a leftward direction A relative to the object O because the latter has been tilted in a right acclivity in FIG. 1, the opposed area of the second stationary electrode plate 19 and the second movable electrode plate 7b is increased and raises the electrostatic capacitance $C_2$ therebetween, whereas the opposed area of the third stationary electrode plate 20 and the second movable electrode plate 7b is decreased and reduces the electrostatic capacitance $C_3$ therebetween. Therefore, the difference ($C_2-C_3$) increases, and the differential amplifier circuit 27 delivers a voltage more than the specified reference voltage to the indicator 29, whereby a cant angle in right acclivity for the object O is indicated on the indicator 29.

On the contrary, assuming that the pendulum 7 has been swung in a rightward direction B relative to the object O because the latter has been tilted in a left acclivity in FIG. 1, the opposed area of the second stationary electrode plate 19 and the second movable electrode plate 7b is decreased to reduce the electrostatic capacitance $C_2$ therebetween, whereas the opposed area of the third stationary electrode plate 20 and the second movable electrode plate 7b is increased thereby to raise the electrostatic capacitance $C_3$ therebetween. Therefore, the difference ($C_2-C_3$) decreases, and the differential amplifier circuit 27 delivers a voltage less than the specified reference voltage to the indicator 29, whereby a cant angle of left acclivity for the object O is indicated on the indicator 29.

It should be noted that the electrostatic capacitance $C_2$ between the second stationary electrode plate 19 and the second movable electrode plate 7b as well as the electrostatic capacitance $C_3$ between the third stationary electrode plate 20 and the second movable electrode plate 7b are detected via the electrostatic capacitance $C_1$ between the first stationary plate 14 and the first movable plate 7a and hence, it is unnecessary to connect a conductor of the electric circuit to the pendulum 7 including the first and second movable electrode plates 7a and 7b. Thus, not only wiring is simplified, but also a smooth swinging movement of the pendulum 7 is achieved.

Furthermore, since the first and second movable electrode plates 7a and 7b are formed respectively by the depending plate 7a and the arcuate plate 7b of the pendulum 7 and are in a two-dimensional arrangement; the first stationary electrode plate 14 opposed to the first movable electrode plate 7a as well as the second and third stationary electrode plates 19 and 20 opposed to the second movable electrode plate 7b are also in a two-dimensional arrangement. Accordingly, each of the opposed electrode plates cannot be interfered from the other, and its opposed area can be freely set, thus providing a widened sensable range of cant angle.

If the pendulum 7 is violently swung due to an external disturbance, the depending plate 7a formed of a non-magnetic material having an electrical conductivity moves rapidly across a magnetic flux running between the magnets 13 of the electrode units 9 and hence, an eddy current is developed in the depending plate 7a so as to inhibit the swinging movement of the pendulum 7. In other words, a magnetic braking force is applied to the pendulum 7, so that the violent swinging movement thereof is damped.

In this embodiment, the base 1 and the bracket plates 2 correspond to a supporting system according to the present invention.

A second embodiment of the present invention will be described below with reference to FIGS. 6 to 12, wherein the description of portions of the same structure as in the previous first embodiment is omitted, and the same reference characters are used to designate the same parts as those in the previous first embodiment.

Referring to FIGS. 6 to 9, a pair of bracket plates 102 are each formed from a magnetic material such as an iron plate and are interconnected at their upper ends through a pair of spacer shafts 105 likewise formed from a magnetic material to constitute a supporting system. In addition, the pivot 8 is fitted in the pendulum 7 serving as a sensing member with an insulating bush 103 interposed therebetween. A common movable electrode is constituted by the depending plate 7a and arcuate plate 7b of the pendulum 7.

An electrode unit 109 is attached to each of the bracket plates 102 and comprises a cylindrical holder 111 made of a magnetic material and secured to the corresponding bracket plate 102 by a machine screw 10, and a permanent magnet 113 which also serves as a first stationary electrode plate and is held in an adsorbed manner on a bottom surface of a recess 112 in a leading end face of the holder 111. The permanent magnet 113 is opposed to the depending plate 7a of the pendulum 7 at a given gap. The sizes of the first stationary electrode plate, i.e., the magnet 113 and the depending plate 7a are selected such that their opposed area may be always invariable in a predetermined sensable range of cant angle.

An insulator 115 is secured to the bracket plates 102 by a pair of mounting shafts 16 to bridge a gap between lower portions of the brakcet plates, and has a partitioning ridge 115a formed on an upper surface thereof.

A printed wiring board 114 having a portion of an electric circuit which will be described hereinbelow is secured to the lower surfaces of the brakcet plates 102 by machine screw 117, and an earth wire for the electric circuit is connected to the lower surfaces with such machine screw 117 used as a conductor.

Figure 10:
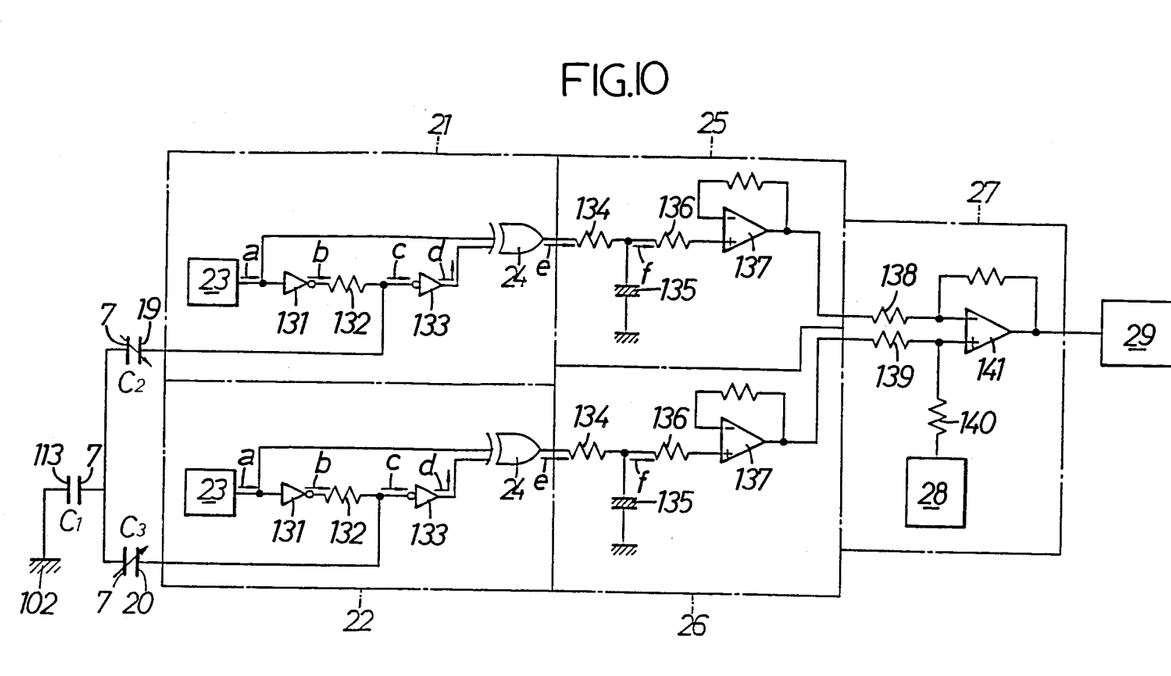
FIG. 10 is a diagram of an electric circuit of the assembly of the present invention.

FIG. 10 illustrates an electric circuit diagram of a cant angle sensor assembly S'. In this Figure, an electrostatic capacitance between the first stationary electrode plate 113 and the pendulum 7, i.e., the common movable electrode is represented by $C_1$; an electrostatic capacitance between the second stationary electrode plate 19 and the pendulum 7 is by $C_2$; and an electrostatic capacitance between the third stationary electrode plate 20 and the pendulum 7 is by $C_3$. The first stationary electrode plate 113 is grounded on the bracket plate 102 through the holder 111, and the second and third stationary electrode plates 19 and 20 are connected to first and second capacitance-pulse train converter circuits 21 and 22, respectively.

Each of the first and second capacitance-pulse train converter circuits 21 and 22 comprises a rectangular-wave oscillator 23, an inverter 131, a resistance 132, an inverter 133, and an exclusive OR gate 24. The resistance 132 constitutes an integration circuit in cooperation with the corresponding electrostatic capacitances $C_2$ or $C_3$ and $C_1$.

First and second pulse train-voltage converter circuits 25 ans 26 are connected to outputs of the first and second capacitance-pulse train converter circuits 21 and 22. Each of the first and second pulse train-voltage converter circuits 25 and 26 comprises a resistance 134, a smoothing capacitor 135, a resistance 136, and an amplifier 137.

A differential amplifier circuit 27 is connected to outputs of the pulse train-voltage converter circuits 25 and 26. The circuit 27 comprises resistances 138, 139 and 140, a horizontal reference voltage setter 28, and a differential amplifier circuit 141.

An indicator 29 is connected to the differential amplifier circuit 27 for indicating a cant angle of the object O in accrodance with an output voltage from the differential amplifier circuit 27.

Description will be made of the operation of this embodiment.

Figure 11:
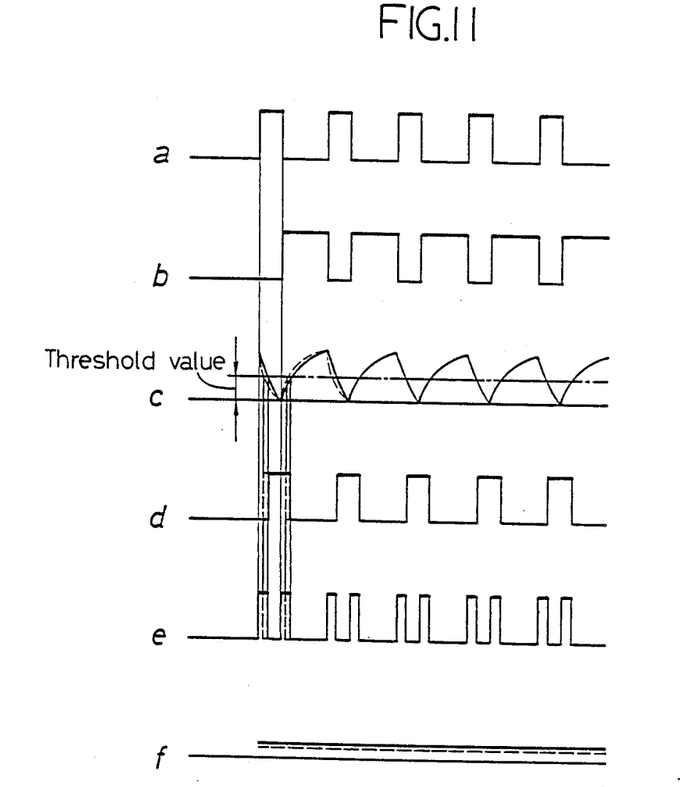
FIG. 11 is a view of waveforms of the individual portions of the electric circuit.

FIG. 11 illustrates the waveforms of outputs from the individual portions of the electric circuit shown in FIG. 10. First, in each of capacitance-pulse train converter circuits 21 and 22, the rectangular-wave oscillator 23 oscillates a rectangular pulse a having a normally constant pulse duration. The pulse a is inverted into a rectangular pulse b in the inverter 131 and is then integrated by the corresponding resistance 132 and electrostatic capacitances $C_2$ or $C_3$ and $C_1$ depending upon the resultant electrostatic capacitance thereof to form an indented pulse c. A waveform exceeding a threshold value of the pulse c is inverted by the inverter 133 to form a rectangular pulse d. The exclusive OR gate 24 receives this pulse d and the aforesaid pulse a to deliver a rectangular pulse e. Then, the pulse e is smoothed in the smoothing capacitor 135, thereby providing a voltage f corresponding to a pulse duration of the pulse e, in other words, to a duty ratio.

The electrostatic capacitance $C_1$ is always constant, while the electrostatic capacitances $C_2$ and $C_3$ vary with the swinging movement of the pendulum 7. If the values of the electrostatic capacitances $C_2$ and $C_3$ decrease, the indented pulse c changes from one drawn by a solid line to one drawn by a broken line. With this changing, the rectangular pulses d and e have their pulse durations decreased from those drawn by solid lines to those drawn by broken lines and hence, the output voltage f from the smoothing capacitor 135 decreases from one drawn by a solid line to one drawn by a broken line. On the contrary, if the values of the electrostatic capacitances $C_2$ and $C_3$ increase the output voltage f increases.

The output voltage f from the smoothing capacitor 135 is amplified in the amplifier 137 and then delivered to the differential amplifier circuit 27.

In the differential amplifier circuit 27, the differential amplifier 141 differentially amplifies output voltages from the first and second pulse train-voltage converter circuits 25 and 26 on the basis of a voltage set by the horizontal reference voltage setter 28. An output from the differential amplifier circuit 27 is supplied to the indicator 29 and indicated as a cant angle thereon.

Now, if the object O is in a horizontal position, the electrostatic capacitance $C_2$ between the second stationary electrode plate 19 and the pendulum 7 is equal to the electrostatic capacitance $C_3$ between the third stationary electrode plate 20 and the pendulum 7 as in the previous first embodiment, i.e., the difference ($C_2-C_3$) between these capacitances is zero. The differential amplifier circuit 27 delivers a voltage $V_m$ of a specified level (see FIG. 12) on the basis of the voltage set by the horizontal reference voltage setter 28, whereby the horizontal position of the object O is indicated on the indicator 29.

Figure 6:
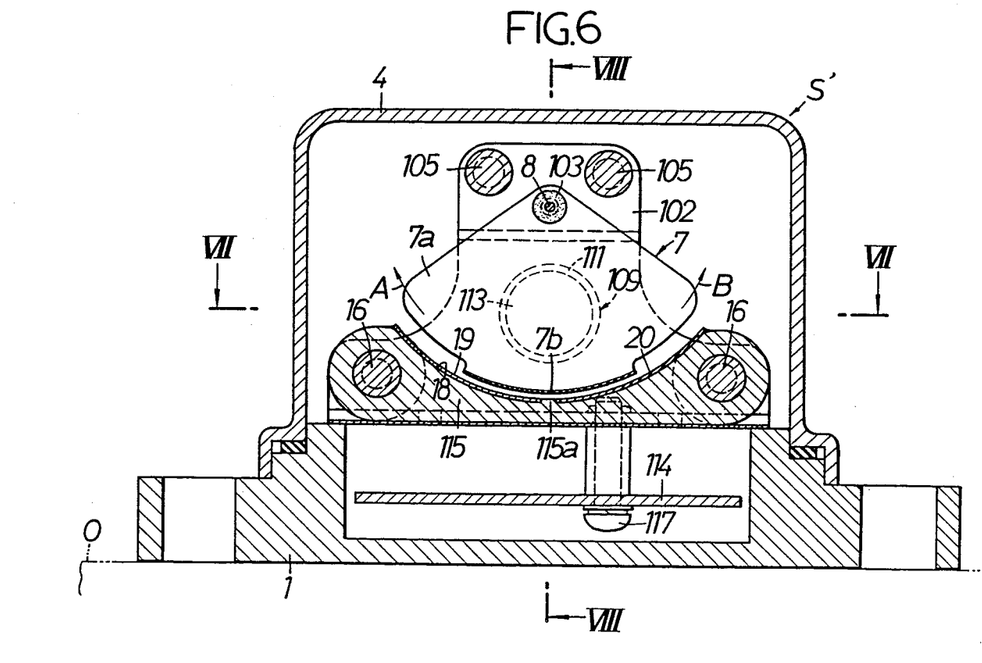
FIG. 6 is a side view in cross section of a cant angle sensor assembly according to the present invention.
Figure 7:
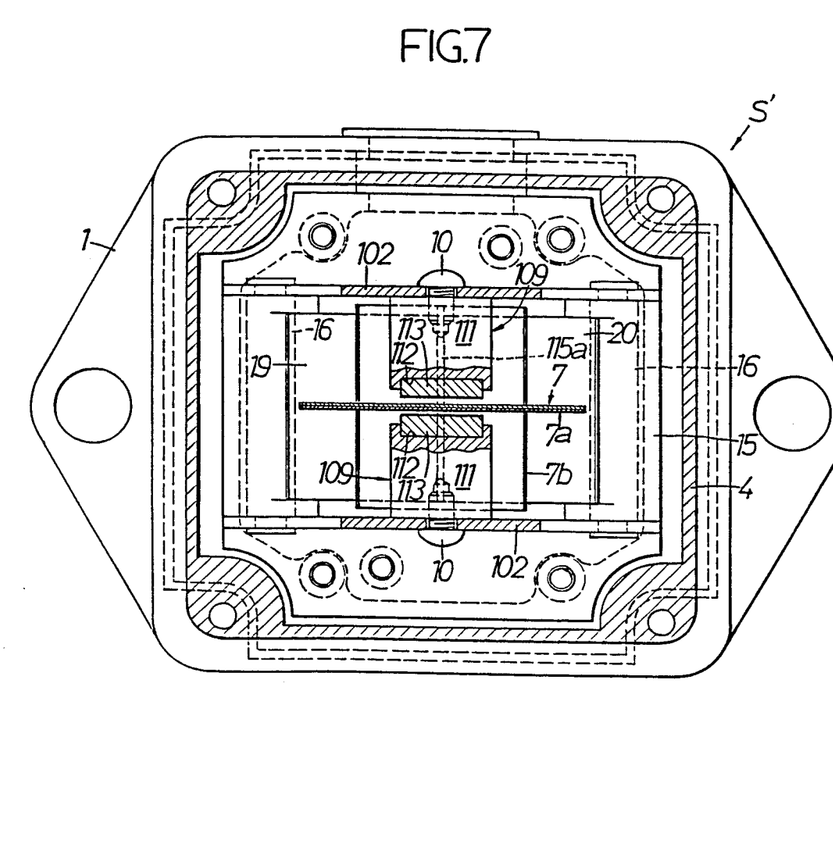
FIGS. 7 and 8 are sectional views taken along lines VII—VII and VIII—VIII in FIG. 6, respectively.
Figure 8:
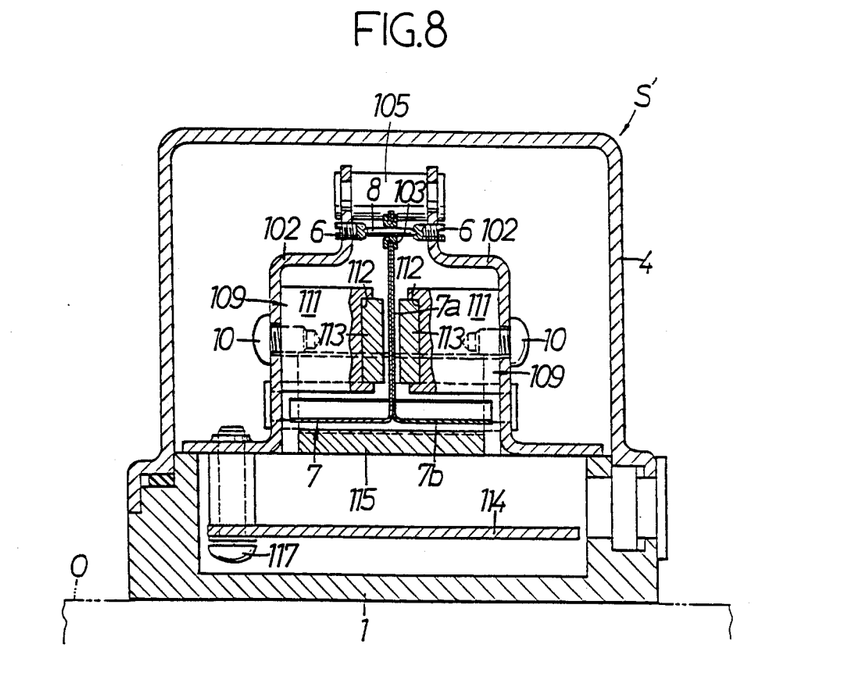
Figure 9:
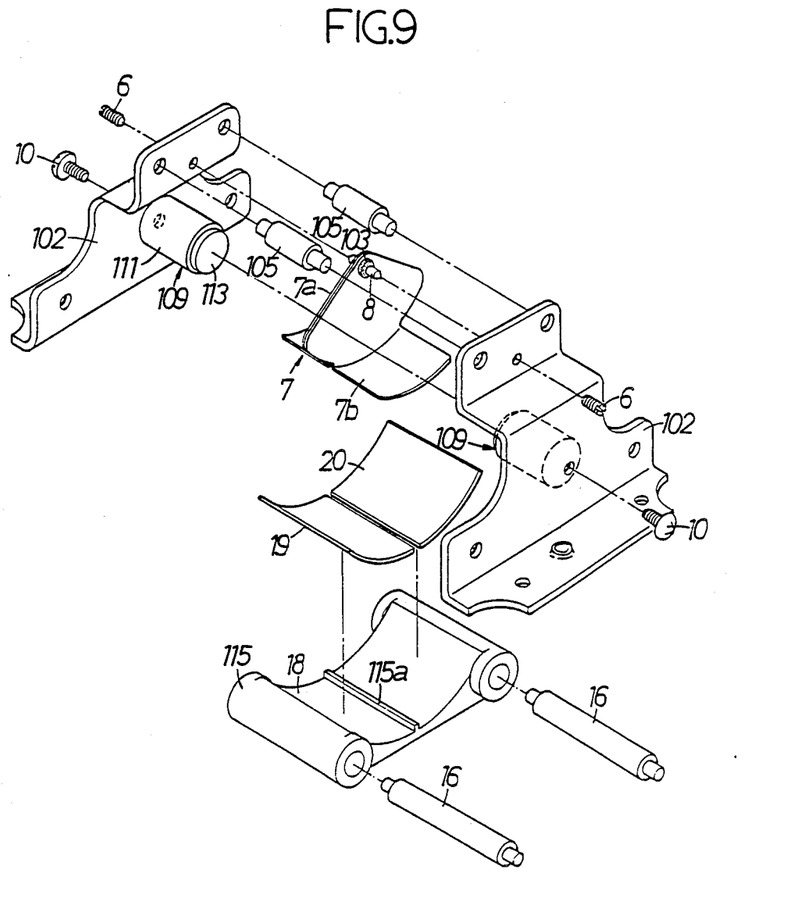
FIG. 9 is a perspective exploded view of details of the assembly of the present invention.
Figure 12:
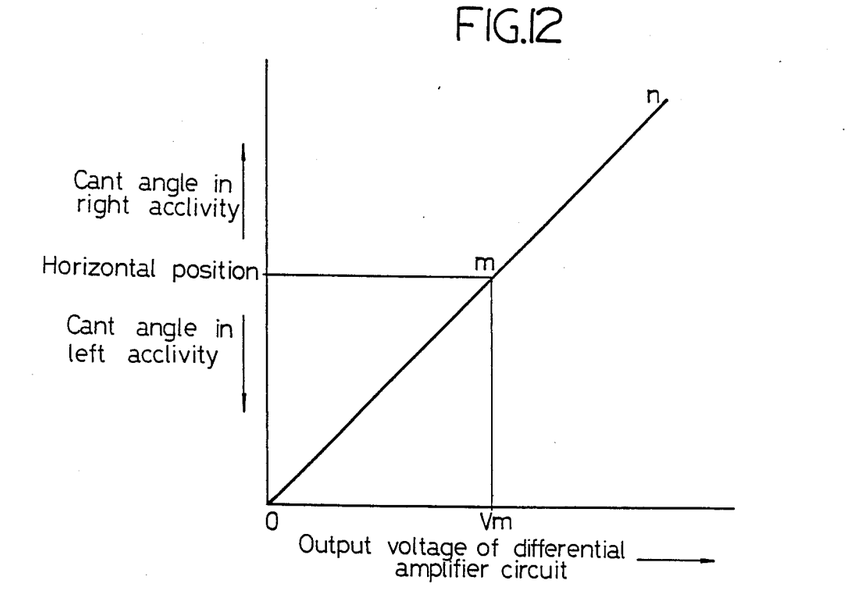
FIG. 12 is a graph illustrating a relationship between output voltage from a differential amplifier circuit and cant angle of an object.

Assuming that the pendulum 7 has been swung in the leftward direction A relative to the object O because the object O has been tilted in a right acclivity in FIG. 6, the difference ($C_2-C_3$) is increased so that the differential amplifier 27 delivers a voltage more than the aforesaid specified reference voltage Vm to the indicator 29, whereby a cant angle of right acclivity of the object O is indicated on the indicator 29 (see a line m-n in FIG. 12).

On the contrary, assuming that the pendulum 7 has been swung in the rightward direction B relative to the object O because the object O has been tilted in a left acclivity, the difference ($C_2-C_3$) is decreased so that the differential amplifier 27 delivers a voltage less than the aforesaid specified reference voltage Vm to the indicator 29, whereby a cant angle in left acclivity of the object O is indicated on the indicator 29 (see a line o-m in FIG. 12).

In the second embodiment, the first stationary electrode plate 113 is fixedly mounted in a grounded condition on the bracket plates 102, and the second and third stationary electrode plates 19 and 20 are fixedly mounted on the bracket plates 102 with the insulator 115 interposed therebetween. Therefore, the bracket plates 102 surround all the electrodes 7, 113, 19 and 20 to exhibit a magnetic shield function, thus making it possible to prevent influences on the electrostatic capacitances $C_1$, $C_2$ and $C_3$ by a floating capacitance and an extraneous noise.

Furthermore, since the pendulum 7, i.e., the common movable electrode is grounded through the electrostatic capacitance $C_1$ to the bracket plates 102, it is unnecessary to connect an earth conductor to the pendulum 7, resulting in a simple wiring.

What is claimed is:

1. A cant angle sensor assembly, comprising:
   a pendulum pivoted on a supporting system adapted to be mounted on an object whose cant angle is to be sensed, for swinging movement in a direction of tilt of the object;
   a movable electrode provided on said pendulum and having a first and a second movable electrode plate;
   a first stationary electrode plate fixedly mounted on the supporting system in an opposed relation to said one of said first and second movable electrode plates of said movable electrode at a predetermined gap, with an area of the first stationary electrode plate opposed to said one of first and second movable electrode plates being invariable despite vibration of the pendulum;
   second and third stationary electrode plates fixedly mounted on the supporting system in an opposed relation to the other of said first and second movable electrode plates of said movable electrode plate at a given gap, so that with swinging movement of the pendulum, areas of the second and third stationary electrode plates opposed to the other of said first and second movable electrode plates are increased and decreased in a manner contrary to each other; and
   an electric circuit arranged to detect an electrostatic capacitance between said movable electrode and each of said second and third stationary electrode plates to provide a voltage corresponding to an amount of tilt of the object, wherein
   said pendulum comprises a depending plate pivoted on the supporting system and an arcuate plate overhanging sideways from a lower end of said depending plate,
   wherein said first movable electrode plate is formed on one of said depending plate and said arcuate plate
   and said second movable electrode plate is formed on the other of said depending plate and said arcuate plate.

2. A cant angle sensor assembly according to claim 1, wherein said pendulum is pivoted on the supporting system by a pivot, and said depending plate of said pendulum is formed such that it is fanned downwardly from said pivot as center.

3. A cant angle sensor assembly according to claim 1, wherein said second and third stationary electrode plates are mounted below the arcuate plate of said pendulum and are spaced from each other in a direction of swinging movement of said pendulum.

4. A cant angle sensor assembly comprising:
   a pendulum pivoted on a supporting system adapted to be mounted on an object whose cant angle is to be sensed, for swinging movement in a direction of tilt of the object;
   a movable electrode formed on said pendulum;
   two stationary electrode plates fixedly mounted on the supporting system in an opposed relation to said movable electrode at a given gap and arrayed in a direction of the swinging movement of the pendulum, so that with the swinging movement of said pendulum, areas of the two stationary electrode plates opposed to the movable electrode are increased and decreased in a manner contrary to each other;

an electric circuit arranged to detect an electrostatic capacitance between said movable electrode and each of said two stationary electrode plates to provide a voltage corresponding to an amount of tilt of the object ; and a pair of additional stationary electrode plates with areas thereof opposed to said movable electrode being invariable despite swing motion of the pendulum, said additional plates being fixedly mounted on said supporting system respectively so as to be opposed to said movable electrode in a direction normal to the swinging direction of the pendulum at a given gap therebetween, and wherein said movable electrode is formed from a non-magnetic material having an electrical conductivity, and a permanent magnet is mounted on each of said pair of additional stationary electrode plates in an opposed relation to said movable electrode plate.

5. A cant angle sensor assembly comprising:

a supporting system made of a magnetic material;

a sensing member mounted on said supporting system and displaceable in accordance with a tilt of said supporting system;

a common movable electrode mounted on said sensing member a first stationary electrode fixedly mounted on said supporting system in a grounded manner and in an opposed relation to the common movable electrode at a given gap, therebetween with an area of the first electrode opposed to the common movable electrode being invariable despite the displacement of the sensing member;

second and third stationary electrodes fixedly mounted on said supporting system in an insulated manner and respectively in an opposed relation to said common movable electrode at a given gap therebetween, so that with the displacement of the sensing member, areas of the second and third stationary electrodes opposed to the common movable electrode are increased and decreased in a manner contrary to each other;

first and second rectangular-wave oscillators mounted respectively in a corresponding re tion to said second and third stationary electrodes;

a first integration circuit for integrating an output from said first rectangular-wave oscillator by utilizing a resultant electrostatic capacitance between said common movable electrode and each of said first and second stationary electrodes;

a second integration circuit for integrating an output from said second rectangular-wave oscillator by utilizing a resultant electrostatic capacitance between said common movable electrode and each of said first and third stationary electrodes; and a differential amplifier circuit for differentially amplifying outputs from said first and second integration circuits, so that an output voltage corresponding to an amount of tilt of said supporting system is derived from said differential amplifier circuit.

6. A cant angle sensor assembly according to claim 5, wherein said sensing member comprises a pendulum pivoted on said supporting system for swinging movement in a direction of tilt of an object to be sensed.

7. A can angle sensor assembly according to claim 1, wherein said first and second movable electrode plates are formed integrally with each other.

* * * * *